Figures 1, 2:
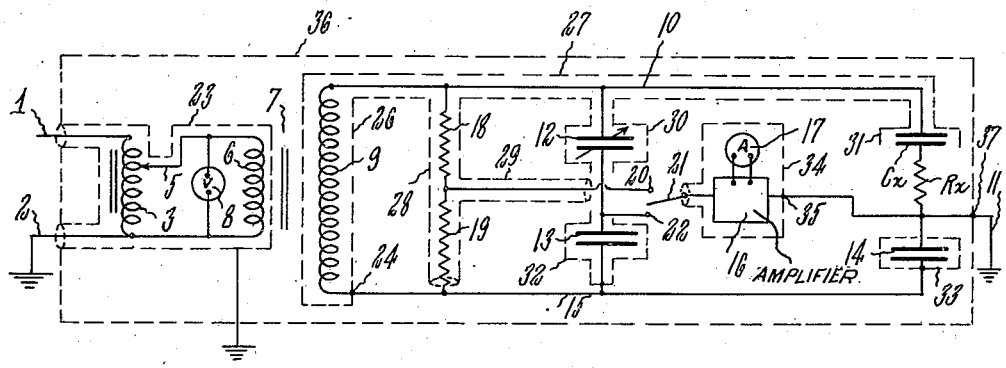

Sept. 7, 1943.   G. H. BROWNING ET AL   2,329,098
APPARATUS FOR DETERMINING THE INSULATING
VALUES OF DIELECTRICS
Filed Aug. 2, 1940

Inventors
Glenn H. Browning
Edmund H. Povey
by Wright, Brown, Quinby & May
Attys.

Patented Sept. 7, 1943

2,329,098

UNITED STATES PATENT OFFICE 2,329,098

APPARATUS FOR DETERMINING THE INSULATING VALUES OF DIELECTRICS

Glenn H. Browning, Winchester, and Edmund H. Povey, Medford, Mass., assignors to Doble Engineering Company, Medford, Mass., a corporation of Massachusetts Application August 2, 1940, Serial No. 349,528

15 Claims. (Cl. 175—183)

The present invention relates to means for testing dielectrics and determining their insulating properties. The substances and articles for the testing in which it is adapted to be used include bushings for oil circuit breakers, transformers, etc., stack and suspension type insulators, potheads, transformer windings, cables, other fabricated dielectrics designed to confine electrical currents to prescribed paths, insulating oils, and many other forms of insulators and insulation. The terms "insulation" and "dielectric" are used synonymously in this specification.

Among the objects of the invention are to provide an apparatus, including a current measuring indicator, so organized as to show by direct reading the total current energy loss through the specimen being tested and to indicate instantly, upon their occurrence, minute changes in the energy loss in the specimen. Some dielectrics suffer a change in their properties with lapse of time during application of the test voltage, whence the energy loss in the dielectric varies. Our object is to detect and measure such variations. A corollary to this object is that of determining the energy loss within minute limits of error. Another object is to provide compact apparatus capable of being readily transported from place to place and of being used to make accurate determinations of the qualities of dielectrics when installed in normal operating association with electrical equipment. Another object is to improve the apparatus produced by the owners of this application pursuant to the Povey and Walker application Serial No. 204,324, filed April 26, 1938, on which Patent 2,273,066 was granted February 17, 1942, so that the apparatus is made more rugged and easier to operate and at the same time able to make finer or closer measurements and to distinguish more minute variations of value than was possible with the preceding apparatus.

As in the case of the preceding application referred to, this apparatus depends for its operation on balancing the effects on the measuring means of the out-of-phase component of current in the specimen and measuring the in-phase component. It differs from the prior application principally in that it employs only one voltage in making tests. In addition, it embodies a novel combination of condensers or resistances or their equivalent with the source of test voltage; and it further includes amplifying means associated with the measuring instrument of the combination, whereby minute variations in the quantities being measured may be determined. The apparatus also includes shielding means for protecting the measuring instrument from the effects of self induction in parts of the apparatus and from disturbing conditions and influences from extraneous sources in the field of use.

Two of the forms in which the present invention may be embodied are shown diagrammatically by the accompanying drawing. These will now be described in detail, reference being directed first to Fig. 1.

An alternating current supply line, represented by the conductors 1 and 2, is connected to the terminals of a variable inductor 3. The shiftable contact 5 of the variable inductor is connected to one terminal of the primary winding 6 of a voltage step-up transformer 7, the other terminal of said primary winding being connected to the conductor 2 of the supply line. The function of the variable inductor is to regulate the voltage impressed across the primary winding 6 and consequently the voltage developed in the secondary winding of said transformer. A voltmeter 8 is connected across the primary winding 6, showing the voltage difference between the terminals thereof; and it may be calibrated to read directly in terms of the voltage across the secondary winding of the transformer.

The transformer secondary is designated as 9. A conductor 10 is connected to the high voltage terminal of coil 9 and is adapted to be led to and connected with the specimen of insulation being tested. Such specimen is shown in this diagram in one of the conventional ways of designating imperfect insulation, as a condenser $C_x$ and a resistance $R_x$ in series. The other terminal or side of the specimen from that to which the conductor 10 leads is represented as grounded at 11. A variable air condenser or capacitor 12 is connected to the conductor 10. Other condensers 13 and 14 (or resistors instead of condensers, if desired), are connected with the variable condenser 12 and the specimen respectively, and with a measuring instrument presently described, in a bridge-type measuring network connected to the low voltage terminal of the secondary winding 9 by a conductor 15.

The measuring means or instrument preferably consists of an electronic amplifier 16 and associated alternating current meter 17. These instruments are of well known character and require no specific description. It is sufficient to say that by providing a series of amplifying tubes, it is possible to make the measuring instrument exceedingly sensitive and to obtain a voltage gain in the order of one hundred thousand times. We prefer to employ a multiplication of this order, whereby we may obtain full scale meter deflections with a watts loss of one hundred microwatts and to determine power factors as low as .01%. So that the gain of the measuring means may be checked at any time, a voltage dividing system consisting of resistors 18 and 19 is connected in series across the secondary winding 9 of the transformer at points between the connections of said winding with the bridge network. A switch point 20 is connected to the junction between said resistors and may be coupled with the amplifier by a switch 21. The resistances of the respective resistors are unequal, that of the resistor 19 being only an exceedingly small fraction of that of resistor 18. For example, the resistance of 18 may be in the order of 100 megohms, while that of 19 may be only 100 ohms. By so connecting the amplifier to the voltage dividing system when the inductor 3 is adjusted to produce a definite known test voltage, the reading of the meter 17 tells the voltage gain of the amplifier. Then, if necessary, the adjusting controls of the amplifier, which are of well known standard character, may be adjusted to cause the meter to show a reading of the desired ratio of multiplication. Such checking observations may be made at any time to ascertain whether or not the amplifier is correctly adjusted, and to enable correct adjustments to be made when necessary.

Power may be taken from any convenient or desired primary source, and the step-up transformer may be designed to raise the voltage to any value suitable for testing. As alternating 60 cycle current at 110 volts is generally available, and a voltage in the neighborhood of 10,000 volts is suitable for most testing purposes, it is convenient to design the apparatus so that such a source of supply may be used and the transformer have a step-up ratio of about 100 to 1. But it is within the scope of this invention to utilize any convenient current supply at any convenient or desired frequency, and to develop a test voltage of any desired magnitude.

In the bridge-type network, the variable condenser 12 and the specimen being tested constitute two of the arms of the measuring network. The other two arms are constituted by the condensers 13 and 14. A switch point 22 is connected between the variable condenser 12 and the condenser 13 and is located to be engaged by the switch 21. The condensers 13 and 14 are much larger in capacitance value than either the test specimen or the variable condenser 12. For example, their capacitances may be in the order to .25 microfarad, while the maximum value of the variable condenser may be in the order of 300 micro-microfarads. Although the condensers 13 and 14 may be of unequal values, provided their capacities are known, it is preferable to make them of equal values in order to simplify the use or calibration of the apparatus.

The apparatus just described is shielded so that no current from the voltage source can pass through, or set up voltage in, the measuring means. The term "voltage source" as used in this specification includes any part of the apparatus across which voltages appear and includes the variable inductor and the primary and secondary windings of the transformer; if a generator is used to supply voltage, it includes such generator; and if both a generator and transformer are used, it includes both. In short, the said term applies to all parts where voltages are generated, whether such parts are connected to external supply lines or are primary or secondary sources of voltage. In the arrangement shown in both present illustrations, the primary winding 6 of the step-up transformer, the variable inductor 3, the voltmeter 8, and their associated leads, are enclosed by a grounded shield 23 or equivalent system of connected shields. A second shield or system of shields is connected to the low potential end of the secondary winding at a guard point 24, and comprises shields 26, enclosing said secondary winding; 27 enveloping the lead 10; 28 and 29 enveloping the resistors 6 and 7 and the lead therefrom to the switch point 20; and a shield 30 enveloping the variable condenser 12. Where the apparatus is used in circumstances which permit shielding of the test specimen, as when tests are made in the laboratory of samples of oil and other compact bodies or masses of insulation, the specimen also is enclosed in a shield 31 which is connected to the shield 27. The condensers 13 and 14 are enclosed by shields 32 and 33, which are connected to the low potential conductor 15 and thereby with the guard point 24; and the measuring means are enclosed in a shield 34 connected at 35 to the conductor which leads from the measuring means to ground or the grounded terminal of the insulation. The function of the grounded shield 23 is to eliminate from the measuring means charging currents which otherwise would flow between the primary and secondary windings of the transformer and pass from the secondary winding through the measuring means to ground. The second described shielding system, or guard shield, is to bring the charging currents which emanate from the secondary winding 9 of the transformer directly back to said winding at the guard point without passing through the measuring means. Both sets of shields together make of the transformer and associated apparatus a voltage source so isolated that charging currents originating therein cannot pass through the measuring means and consequently do not cause erroneous indications by the measuring means. Thus only the charging current through the specimen and the bridge network is able to influence the measuring instrument.

When the conditions of use subject the specimen and apparatus to electrostatic influences, the whole apparatus, including the shielded specimen, is enclosed in a metal casing 36 which is grounded as, for instance, through a connection 37. Such casing constitutes an outer shield and eliminates all stray influences from electrostatic fields. Its employment is essential, even in laboratory work, when very sensitive measurements involving fine and accurate determinations are made, in order to eliminate even such small influences as derive from electrostatic fields caused by neighboring circuits.

Where the apparatus is designed for employment in circumstances which prevent shielding the specimen and where strong electrostatic fields are present, a reversing switch is provided in the connection from the variable inductor 3 to the primary winding 6. Such a reversing switch is shown at 38 in Fig. 2 and a like switch is adapted and intended to be connected in like manner in the inductor and primary winding combination of Fig. 1 to compensate for the effects of such electrostatic fields. The circumstances last referred to include the testing of apparatus such as oil circuit breakers, transformer insulation, potheads, stack insulators, etc., in physical association with the apparatus which they are designed to insulate. Insulation of this type has one terminal connected solidly to ground and cannot conveniently be ungrounded. In making a test of such devices, the lead to the high tension terminal of the insulation is disconnected and the shielded test cable 10 is substituted. Insulation of this character is usually subjected to electrostatic influences from neighboring high voltage lines which set up voltages between the conductor which is insulated by the test specimen, and ground. The induction then picked up by the specimen will have the same phase at all times, which may be in any phase relationship to the test voltage. If the voltage thus set up in the specimen is more or less in phase with the test voltage, the watts loss and the charging current indicated by the measuring means of the testing apparatus will be greater than the true value; whereas if the test voltage is reversed 180 electrical degrees, the voltage set up in the specimen by the electrostatic field will be equally out of phase with the applied test potential, wherefore the watts loss and charging current as indicated by the measuring instrument will be smaller than the true values in equal measure. The reversing switch enables the phase of the test voltage to be changed by 180 electrical degrees, whereby the average of readings taken before and after changing this switch gives the true value of watts loss and charging current.

Fig. 2 further shows modifications designed to make the apparatus more compact than the one illustrated in Fig. 1, and also to adapt the apparatus for testing various specimens which differ in capacity from one another through a wide range. Greater compactness is achieved by substituting a much smaller low loss condenser 12a for the large variable air capacitor 12, and by substituting a variable resistor 39, the shiftable contact of which is connected with the switch contact 22, for the condenser 13. Such resistor is here shown as of the potentiometer type; but others may be used. Accommodation to test pieces of varying capacitances is accomplished by substituting for the fixed condenser 14 step resistors 40, 41, 42, 43, 44, (or a greater or less number if desired), of which their respective resistances may range from a few ohms to several thousand ohms. This modification also includes a condenser 45, one side of which is connected at 46 to the low potential side of the measuring network, and a switch 47 adapted to connect the other side of this condenser with the conductor from the potentiometer slider to the switch contact 22. In all other respects the apparatus shown in Fig. 2 is like that shown in Fig. 1 and corresponding parts are designated by the same reference characters. The shielding is likewise essentially the same except that, when provided with a cable for conducting the test voltage to the specimen, which may be at a long distance from the testing apparatus, an outer shield 48 is applied around the shield 27 of the cable and is grounded, either through connection with the grounded casing or shield 30, or otherwise.

In using a testing set of this invention to test samples or specimens of insulation of small bulk which are capable of being shielded, the specimen is enclosed in a shield, as 31, and connections are made at one terminal with the lead conductor 10 and at the other with ground. Current is turned on to the filament or filaments of the amplifier, and the variable inductor 3 is connected to the supply line and adjusted to bring the voltage to the magnitude required for the test. If any question or doubt exists as to the voltage amplification made by the amplifier, switch 21 is moved to the contact point 20 and a reading taken of the meter. If the amplification indicated thereby is too high or too low, proper adjustment of the controls is made to bring it to the correct magnitude. Then the switch is shifted to the contact point 22, which connects it with the bridge circuit.

With the form of apparatus employing a variable condenser such as the capacitor 12, such capacitor is adjusted until the meter reading becomes a minimum. The adjustment so made balances, or substantially eliminates, the component of current passing through the specimen that is out of phase with the test voltage, and the meter 17 then indicates the in-phase component of the current. The in-phase component is proportional to the energy loss, or watts loss, in the insulation; wherefore the meter may be calibrated to read in terms of watts loss. The total charging current or capacitance of the insulation under test is determined from a calibration curve for the condenser 12 obtained by reference to known standards. The capacitance of this condenser, when minimum reading of the meter is obtained, is proportional to the capacitance of the test specimen. Power factor is obtained from the values so determined, and the meter may be calibrated to read power factor directly. It may have two scales, one showing watts loss and the other, power factor.

In using the modification where a variable resistor is substituted for the variable condenser, the preliminary steps are substantially the same, but when the switch of the amplifier is connected with the contact point 22, the slider or traveler of the resistor 39 is first set at the point 49, whereby the resistor is removed entirely from the circuit of the measuring instrument, and the voltage developed across the meter is that due to the total charging current of the specimen. The meter reading then is proportional to this total current. In this situation one of the resistance elements 40, 41, etc., is in shunt with the meter between ground and the low voltage terminal of the transformer winding 9, and its resistance value must be applied as a multiplier to determine the actual value of the total charging current. Then the slider is moved along the variable resistor until a minimum deflection is indicated on the meter. As in the previous case, the minimum deflection occurs when the out-of-phase component of current through the test specimen is balanced and the voltage between ground and the contact point of the variable resistor is proportional to the in-phase component. The value of the in-phase current indicated by the meter deflection is determined by using the same multiplier as for the total current. The power factor of the specimen is obtained by dividing the in-phase current by the total current. The resistance taken as the multiplier in any case is that of the element of the group 40 to 44 which is put in circuit to adjust the apparatus according to the capacitance of the insulation being tested.

When such an apparatus having a reversing switch, such as the switch 38, is used for testing unshielded specimens within the influence of an electrostatic field, conditions may be such that the arithmetical average of the readings taken with the reversing switch in the two positions previously described fails to give the true values sought. Such a condition occurs when the voltage set up in the specimen, due to this influence, is so great as to make the apparent value of the energy loss, as indicated by the measuring means, less than zero. The resultant of the in-phase current due to the test potential and that due to induction is then negative. It is necessary in such a case that the operator determine whether such resultant in-phase current is positive or negative, in order to obtain the correct average. The condenser 45 with its controlling switch 47 is a means for making such a determination. When switch 47 is closed, the condenser changes the phase of the current through the balancing portion of the resistance potentiometer 39 and consequently the meter indication. The meter will show a higher indication if the watts loss in the specimen is positive, and lower if the watts loss is apparently negative. Comparison of the readings with the switch 47 opened and closed informs the operator whether or not the induction is sufficient to cause apparent negative watts loss in the specimen. In other words, the condenser 45 and switch 47 are merely "sense" indicators to enable the operator to determine the algebraic sign of the watts loss by noting the movement of the meter indicator when the switch is closed. Readings made with switch 47 closed are not used in determination of values. Then, by taking the algebraic sum of the readings made with the reversing switch 38 first in one position, and then in reversed position, and dividing it by two, the operator can determine the correct value of the energy loss in the specimen. Other means of informing the operator whether the energy loss and charging current are positive or negative under conditions of induction may be employed in the combination within the scope of this invention. Any such means may be employed as well in connection with the organization shown in Fig. 1 as with that shown in Fig. 2.

The electronic amplifier is preferably combined with a voltage dividing system at the input side and with adjusting means whereby the voltage applied to it may be selective. Such voltage dividing system is installed between the switch 21 and the conductor which is shown in the diagram as leading from the part designated as 16 to ground. It is or may be of well known character and needs no further description or illustration. The current meter 17 may have a number of different scales corresponding to the steps of such voltage dividing system.

It is to be noted that in the use of the apparatus of this invention, only one voltage is employed. This avoids the difficulty of maintaining two voltages in the same ratio and phase relation under various circuit conditions. Also, the measuring means are connected in the circuit while adjustments are being made in the determination of energy loss. Thus the indicator of the measuring means follows the adjustment and indicates instantly when the required adjustment has been completed. In this respect the invention is an important advance over the bridges and other types of apparatus heretofore known having balancing circuits which are operated to balance both the in-phase and out-of-phase components of current in the specimen by means of known standards. The new step of this invention also allows minute variations of energy loss occurring during the continuance of applied test voltage, thus measuring the changes in the properties which may occur at such times. The apparatus is extremely sensitive and is capable of measuring such small power factors as are encountered in high grade insulating oils, and of discriminating and detecting the differences between specimens of insulation of the highest and best qualities. The same characteristics enable qualitative determinations and comparisons to be made with great rapidity where exactitude of measurements within minute limits is not required. In such cases a rapidly obtained approximation to the minimum meter deflection enables great numbers of insulators to be tested in a short time and determinations made as to whether or not they are of good enough quality to serve the purposes for which they are designed.

What we claim and desire to secure by Letters Patent is:

1. An apparatus for testing the quality of insulation, comprising a source of alternating voltage adapted to be connected in circuit with a speciment of insulation, bridge-type elements adapted to be connected in series across the terminals of the voltage source, means for substantially eliminating from the after-mentioned measuring means the effects of currents passing through the specimen which are out of phase with the impressed alternating voltage while permitting such measuring means to be influenced by in-phase currents, measuring means adapted to be connected in the circuit to indicate values determinative of energy loss through the specimen, and means for determining whether the energy loss so indicated is positive or negative.

2. An apparatus for testing the quantity of insulation when one terminal thereof is grounded, comprising a source of alternating voltage adapted to be connected in circuit with the high tension terminal and the grounded terminal of the test specimen of insulation, elements adapted to be connected with the test specimen in a measuring network across the terminals of the voltage source, measuring means adapted to be connected in circuit between the grounded and nongrounded terminals of such network to indicate values determinative of energy loss through the specimen, means for substantially eliminating from said measuring means the effects of currents passing through the insulation which are out of phase with the impressed alternating voltage while permitting in-phase currents to influence the measuring means, and means adapted to be actuated for showing whether the loss so indicated is positive or negative.

3. An apparatus for testing insulation comprising a source of alternating voltage so shielded as to substantially eliminate from the after-mentioned measuring means charging currents originating in the apparatus itself, means for connecting said source with a test specimen of insulation, measuring means adapted to be connected in circuit with said source and specimen to indicate values determinative of energy loss through the specimen, means for eliminating from the measuring means the effects of currents passing through the insulation which are out of phase with the impressed alternating voltage and permitting the in-phase currents to influence the measuring means, and means for determining whether the energy loss indicated by said measuring means is positive or negative.

4. An apparatus for testing insulation of which one terminal is grounded, comprising a source of alternating voltage so shielded as to substantially eliminate from the after-mentioned measuring means charging currents originating in the apparatus itself, means for connecting said source in circuit with a test specimen of insulation in a manner such as to impress voltage on the specimen, measuring means adapted to be connected in circuit with the source and specimen, means for eliminating from the measuring means the effects of currents passing through the specimen which are out of phase with the impressed alternating voltage and permitting the in-phase currents to influence said measuring means, and means for determining whether the energy loss indicated by the measuring means is positive or negative.

5. An apparatus for testing the quality of insulation when one terminal thereof is grounded, comprising a source of alternating voltage, means adapted to make electrical connection between the high tension terminal of said source and the high tension terminal of a test speciment of insulation, elements adapted to be connected with the test specimen in a measuring network across the terminals of the voltage source, one of which elements is adjustable so as substantially to eliminate from the after-mentioned measuring means the effects of currents passing through the specimen which are out of phase with the impressed alternating voltage while permitting such measuring means to be influenced by the in-phase currents, measuring means adapted to be connected in circuit between the grounded and non-grounded terminals of such network to indicate values determinative of energy loss through the specimen, and means for determining whether the energy loss so indicated is positive or negative.

6. An apparatus for testing the quality of insulation when one terminal thereof is grounded, comprising a source of alternating voltage, means adapted to make electrical connection between the high tension terminal of said source and the high tension terminal of a test specimen of insulation, elements adapted to be connected with the test specimen in a measuring network across the terminals of the voltage source, one of which elements is adjustable so as substantially to eliminate from the after-mentioned means the effects of currents passing through the specimen which are out of phase with the impressed alternating voltage while permitting such measuring means to be influenced by the in-phase currents, measuring means adapted to be connected in circuit between the grounded and non-grounded terminals of such network to indicate values determinative of energy loss through the specimen, and phase changing means adapted to be connected in parallel with said adjustable elements.

7. An apparatus for testing the quality of insulation when one terminal thereof is grounded, comprising a source of alternating voltage, an electrically conductive connection between the high tension terminal of said source and the high tension terminal of the test specimen of insulation, elements adapted to be connected with the test specimen in a measuring network across the terminals of the voltage source, one of which elements is adjustable so as substantially to balance the effects in the after-mentioned measuring means of the out-of-phase component of alternating current through the specimen, measuring means adapted to be connected in circuit between the grounded and non grounded terminals of such network to indicate values determinative of energy loss through the specimen, shielding means for said voltage source organized to substantially eliminate from the measuring circuit charging currents originating in the apparatus itself, said shielding means surrounding the high tension terminal and being connected to the low tension end of the voltage source, and means for determining whether the energy loss indicated by the measuring means is positive or negative.

8. An apparatus for testing the quality of insulation when one terminal thereof is grounded, comprising a source of alternating voltage, an electrically conductive connection between the high tension terminal of said source and the high tension terminal of the test specimen of insulation, elements adapted to be connected with the test specimen in a measuring network across the terminals of the voltage source, one of which elements is adjustable so as substantially to balance the effects in the after-mentioned measuring means of the out-of-phase component of alternating current through the specimen, measuring means adapted to be connected in circuit between the grounded and non grounded terminals of such network to indicate values determinative of energy loss through the specimen, shielding means for said voltage source organized to substantially eliminate from the measuring circuit charging currents originating in the apparatus itself, said shielding means surrounding the high tension terminal and being connected to the low tension end of the voltage source, and phase changing means adapted to be connected in parallel with said adjustable element.

9. A measuring apparatus of the character described, comprising a source of alternating voltage, a measuring means including an electronic amplifier and a meter connected for actuation by the output voltage of such amplifier, conductors and elements adapted to be connected with a test specimen of insulation in a bridge-type measuring instrument, one of said elements being adjustable to balance the effect on the measuring means of the out-of-phase component of current passing through the insulation, the measuring means being connected across the network to show indications proportional to the in-phase component of said current, and means for determining whether the values shown by such indications are apparently positive or negative.

10. A measuring apparatus as set forth in claim 9, combined with shielding means arranged and organized to eliminate from the measuring means charging currents originating in the voltage source and in the connection between the voltage source and the test specimen.

11. An apparatus for determining the quality of insulation when one terminal thereof is grounded, comprising a source of alternating voltage, a reversing switch connected for operation to reverse the voltage produced by said source, a condenser, a variable resistor, and a series of step resistors adapted to be connected in a bridge-type measuring network with a test specimen of insulation in such manner that the specimen constitutes one arm of the network, a conductor leading from the high tension terminal of the voltage source and being adapted for connection to the high tension terminal of the test specimen, means for connecting alternatively one or another of said step resistors in the measuring network, and measuring means adapted for connection across the network to show indications proportional to the in-phase component of current passing through the insulation, said variable resistor being adjustable to balance the effect on the measuring means of the out-of-phase component of said current.

12. An apparatus as set forth in claim 11, combined with means for determining whether the resultant of the in-phase component of current due to the test voltage and that due to induction in the specimen from an external electrostatic field is positive or negative.

13. A testing apparatus as set forth in claim 11, combined with phase changing means adapted to be connected in parallel with said variable resistor in the measuring network.

14. The method of testing grounded insulation when subjected to the influence of an electrosatic field, which consists in coupling a specimen of such insulation in a measuring network, one element of which is adjustable so as substantially to eliminate the out-of-phase component of alternating current from a voltage source through the specimen, applying alternating test voltage of known magnitude to the high tension terminal of the specimen, connecting between the high and low voltage terminals of the network a measuring instrument having means for indicating values determinative of energy loss through the specimen, adjusting the adjustable member of the measuring network until the indication of the current meter is a minimum, and changing the phase of the current through the adjustable element.

15. The method of testing grounded insulation under subjection to the influence of an electrostatic field, which consists in connecting a specimen of the insulation under test as one arm of a measuring network, another arm of which is adjustable to substantially balance or nullify the out-of-phase component of alternating current through the specimen, connecting a measuring means having a direct reading deflecting instrument between the high and low voltage terminals of said measuring network, applying alternating test voltage of known magnitude to the high tension terminal of said specimen from a voltage source so shielded as to confine the currents in the apparatus to their prescribed paths, adjusting the adjustable member of said network until the indication of the deflecting instrument is a minimum value, and changing the phase of the current through the balancing portion of said adjustable arm.

GLENN H. BROWNING.
EDMUND H. POVEY.